United States Patent
Matsuoka

(10) Patent No.: US 12,305,822 B2
(45) Date of Patent: May 20, 2025

(54) LIGHT SOURCE UNIT FOR VEHICLE LAMP, VEHICLE LAMP

(71) Applicant: Ichikoh Industries, Ltd., Isehara (JP)

(72) Inventor: Kenji Matsuoka, Isehara (JP)

(73) Assignee: Ichikoh Industries, Ltd., Isehara (JP)

( * ) Notice: Subject to any disclaimer, the term of this patent is extended or adjusted under 35 U.S.C. 154(b) by 0 days.

(21) Appl. No.: 18/003,862

(22) PCT Filed: Jun. 22, 2021

(86) PCT No.: PCT/JP2021/023496
§ 371 (c)(1),
(2) Date: Dec. 29, 2022

(87) PCT Pub. No.: WO2022/004472
PCT Pub. Date: Jan. 6, 2022

(65) Prior Publication Data
US 2023/0258308 A1    Aug. 17, 2023

(30) Foreign Application Priority Data

Jun. 30, 2020    (JP) ................. 2020-113111
Mar. 23, 2021    (JP) ................. 2021-048801

(51) Int. Cl.
*F21S 41/19*    (2018.01)
*F21S 41/143*   (2018.01)
*F21S 43/20*    (2018.01)

(52) U.S. Cl.
CPC ............ *F21S 41/19* (2018.01); *F21S 41/143* (2018.01); *F21S 43/26* (2018.01)

(58) Field of Classification Search
CPC ........ B60Q 1/0094; F21K 9/23; F21S 41/143; F21S 41/19; F21S 41/192; F21S 43/14;
(Continued)

(56) References Cited

U.S. PATENT DOCUMENTS 10,605,427 B1    3/2020  Chen et al.
2015/0061535 A1*  3/2015  Hino ................. H05B 45/10
                                                  315/291
(Continued)

FOREIGN PATENT DOCUMENTS

DE   10 2018 202 464 A1   8/2018
EP      3 575 678 A1     12/2019
(Continued)

OTHER PUBLICATIONS

Translation of JP 2016149373 provided by Espacenet (Year: 2016).*
(Continued)

*Primary Examiner* — Zheng Song
(74) *Attorney, Agent, or Firm* — Oblon, McClelland, Maier & Neustadt, L.L.P.

(57) ABSTRACT

The present invention enables further improvement of luminous efficiency of a semiconductor light-emitting element. In the present invention, a mounting member, a substrate, two semiconductor light-emitting elements, and three terminals are configured as a socket which is an integral structure, while a control circuit is configured separately from the socket. As a result, in the present invention, the control circuit is separated from the substrate of the socket, and therefore it becomes possible to further improve the luminous efficiency of the semiconductor light-emitting elements.

18 Claims, 9 Drawing Sheets

(58) Field of Classification Search
CPC .......... F21S 43/195; F21S 45/00; F21S 45/48; F21Y 2115/10
See application file for complete search history.

(56) References Cited

U.S. PATENT DOCUMENTS

| | | | |
|---|---|---|---|
| 2016/0061424 A1* | 3/2016 | Hatanaka | F21S 43/14 |
| | | | 362/382 |
| 2016/0290621 A1* | 10/2016 | Ozawa | F21V 29/74 |
| 2017/0009953 A1* | 1/2017 | Kosugi | F21S 45/50 |
| 2017/0097136 A1* | 4/2017 | Hino | F21V 29/767 |
| 2017/0146213 A1* | 5/2017 | Kosugi | F21S 43/195 |
| 2017/0223805 A1* | 8/2017 | Kosugi | H05B 45/397 |
| 2018/0023795 A1 | 1/2018 | Elwell et al. | |
| 2018/0142879 A1 | 8/2018 | Elwell et al. | |
| 2019/0368677 A1* | 12/2019 | Shiraishi | F21V 29/74 |
| 2020/0238890 A1* | 7/2020 | Ichikawa | H05B 45/48 |
| 2020/0355342 A1* | 11/2020 | Hatanaka | F21S 43/13 |
| 2022/0128211 A1* | 4/2022 | Ueno | F21S 45/48 |

FOREIGN PATENT DOCUMENTS

| | | |
|---|---|---|
| JP | 2008-243476 A | 10/2008 |
| JP | 2011-146483 A | 7/2011 |
| JP | 2012-84280 A | 4/2012 |
| JP | 2015-41452 A | 3/2015 |
| JP | 2015-56232 A | 3/2015 |
| JP | 2016-149373 A | 8/2016 |
| JP | 2018-67451 A | 4/2018 |

OTHER PUBLICATIONS

Translation of JP 2012084280 provided by Espacenet (Year: 2012).*
International Search Report issued Sep. 7, 2021 in PCT/JP2021/023496, filed on Jun. 22, 2021, 3 pages.
Japanese Office Action issued Sep. 26, 2023 in Japanese Patent Application No. 2021-048801 (with English Translation), 9 pages.
Extended European Search Report issued Jan. 3, 2024 in European Patent Application No. 21834182.4, 10 pages.
European Office Action issued on Oct. 11, 2024 in European Patent Application No. 21 834 182.4, 5 pages.

* cited by examiner

LIGHT SOURCE UNIT FOR VEHICLE LAMP, VEHICLE LAMP

TECHNICAL FIELD

The present invention relates to a light source unit for a vehicle lamp, and a vehicle lamp.

BACKGROUND ART

As a light source unit for a vehicle lamp and a vehicle lamp, in which a semiconductor light-emitting element and a control circuit are separately configured, there is, for example, PTL 1. In the following, PTL 1 will be described.

In a light source module for a vehicle lamp and a vehicle lamp in PTL 1 (hereinafter referred to as a "light source module in PTL 1"), a light-emitting element is provided on a first substrate, a drive circuit is provided on a second substrate, and the first substrate is mounted on a first housing, and the second substrate is mounted on a second housing.

The light source module in PTL 1 divides the first substrate on the light-emitting element side and the second substrate on the drive circuit side, the light-emitting element is separated from heat of the drive circuit, and luminous efficiency of the light-emitting element is improved.

CITATION LIST

Patent Literature

PTL 1: Japanese Patent Application Laid-open No. 2018-67451

SUMMARY OF THE INVENTION

Problems to be Solved by the Invention

However, although the light source module in PTL 1 divides the first substrate on the light-emitting element side and the second substrate on the drive circuit side, the first substrate on the light-emitting element side and the second substrate on the drive circuit side are integrally incorporated in a socket. As a result, in the light source module in PTL 1, the light-emitting element is affected by the heat of the drive circuit, and therefore further improvement of the luminous efficiency of the light-emitting element may be hindered.

The problem to be solved by the present invention is to provide a light source unit for a vehicle lamp and a vehicle lamp capable of further improving the luminous efficiency of a semiconductor light-emitting element.

Means for Solving the Problem

A light source unit for a vehicle lamp of the present invention includes: a mounting member mounted on the vehicle lamp; a substrate mounted on the mounting member; a semiconductor light-emitting element electrically connected to the substrate; a power supply member mounted on the mounting member and the substrate and electrically connected to the semiconductor light-emitting element; a control circuit that controls light emission of the semiconductor light-emitting element; and a connector that electrically connects the power supply member to the control circuit, wherein the mounting member, the substrate, the semiconductor light-emitting element, and the power supply member are configured as a socket which is an integral structure, and the control circuit is configured separately from the socket.

In the light source unit for a vehicle lamp of the present invention, a plurality of the semiconductor light-emitting elements and a plurality of the power supply members are preferably provided, and the plurality of semiconductor light-emitting elements are preferably mounted on the substrate.

In the light source unit for a vehicle lamp of the present invention, the control circuit preferably has an operating voltage for operating in a case where a forward voltage of the semiconductor light-emitting elements is a predetermined value, and the operating voltage of the control circuit preferably exceeds the predetermined value in a case where a plurality of the light source units for a vehicle lamp are provided.

In the light source unit for a vehicle lamp of the present invention, the substrate is preferably mounted with a resistor, a plurality of the power supply members are preferably composed of: a first terminal that supplies power to a plurality of the semiconductor light-emitting elements via the resistor; a second terminal that supplies power to a plurality of the semiconductor light-emitting elements without going through the resistor; and a common ground terminal, and the connector is preferably composed of a first connector that electrically connects the first terminal and the ground terminal to the control circuit, or a second connector that electrically connects the second terminal and the ground terminal to the control circuit.

In the light source unit for a vehicle lamp of the present invention, the socket and the control circuit of the light source unit for a vehicle lamp are preferably a common socket and a common control circuit, in a case where a forward voltage of the semiconductor light-emitting element is less than a predetermined operating voltage of the control circuit, the first terminal and the ground terminal are preferably electrically connected to the control circuit by the first connector, and in a case where the forward voltage of the semiconductor light-emitting element is not less than the predetermined operating voltage of the control circuit, the second terminal and the ground terminal are preferably electrically connected to the control circuit by the second connector.

In the light source unit for a vehicle lamp of the present invention, the control circuit preferably controls a low beam lamp unit and a high beam lamp unit.

In the light source unit for a vehicle lamp of the present invention, a plurality of the semiconductor light-emitting elements are preferably mounted on a central portion of the substrate, a plurality of the power supply members are preferably mounted on a lower edge portion of the substrate, and the resistor is preferably provided on an upper edge portion of the substrate.

In the light source unit for a vehicle lamp of the present invention, the semiconductor light-emitting element is preferably mounted on the mounting member.

In the light source unit for a vehicle lamp of the present invention, the substrate preferably has: a first substrate mounted with the semiconductor light-emitting element; and a second substrate mounted with the power supply member, the first substrate and the second substrate are electrically connected to each other, the semiconductor light-emitting element and the power supply member are electrically connected to each other via the first substrate and the second substrate.

A vehicle lamp of the present invention includes: a lamp housing and a lamp lens that form a lamp chamber; and the light source unit for a vehicle lamp of the present invention, wherein in the socket of the light source unit for a vehicle lamp, a portion on a semiconductor light-emitting element side is disposed inside the lamp chamber and a portion on a power supply member side is disposed outside the lamp chamber, or an entire portion is disposed inside the lamp chamber, and the control circuit of the light source unit for a vehicle lamp is disposed inside or outside the lamp chamber, separately from the socket, and is electrically connected to a battery.

Effect of the Invention

In a light source unit for a vehicle lamp and a vehicle lamp of the present invention, it is possible to further improve luminous efficiency of a semiconductor light-emitting element.

MODE FOR CARRYING OUT THE INVENTION

Figure 1:
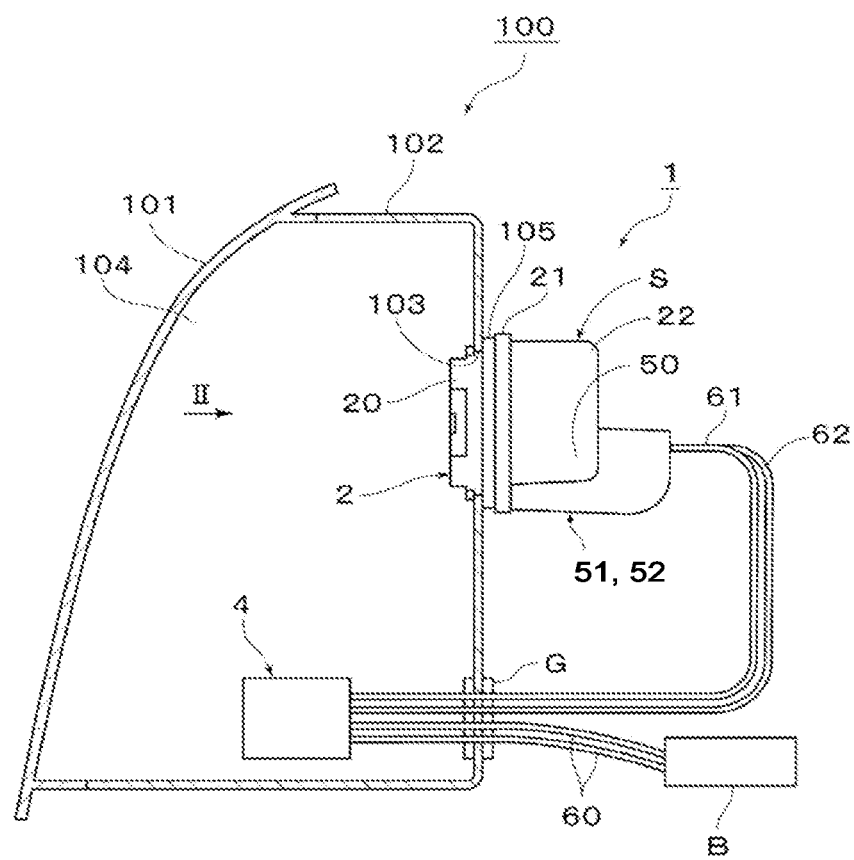
FIG. 1 is a schematic vertical cross-sectional view of a use state illustrating a first embodiment of a light source unit for a vehicle lamp and a vehicle lamp according to the present invention.

Hereinafter, three embodiments (practical examples) of a light source unit for a vehicle lamp and a vehicle lamp according to the present invention and a modification will be described in detail with reference to the drawings.

In this specification, front, rear, top, bottom, left, and right refer to front, rear, top, bottom, left, and right when the light source unit for a vehicle lamp and the vehicle lamp according to the present invention is mounted on a vehicle (not illustrated).

Since the drawings are schematic diagrams illustrating the light source unit for a vehicle lamp and the vehicle lamp according to the present invention, the details of the light source unit for a vehicle lamp and the vehicle lamp according to the present invention are omitted in the drawings.

In addition, some hatching is omitted.

(Description of Configuration of First Embodiment)

FIG. 1 to FIG. 4 each illustrate a first embodiment of the light source unit for a vehicle lamp and the vehicle lamp according to the present invention. Hereinafter, configurations of a light source unit 1 for a vehicle lamp according to this first embodiment (hereinafter, referred to as the "light source unit 1") and a vehicle lamp 100 according to this first embodiment (hereinafter, referred to as the "vehicle lamp 100") will be described.

(Description of Vehicle Lamp 100)

In this example, the vehicle lamp 100 is a front combination lamp. The vehicle lamp 100 is installed on each of the left and right sides of the front of the vehicle (not illustrated). As illustrated in FIG. 1, the vehicle lamp 100 includes a lamp housing 102, a lamp lens 101, and the light source unit 1.

The lamp housing 102 is made of, for example, a light impermeable resin member. The lamp housing 102 has a hollow shape with one side open and the other side closed. A mounting hole 103 is provided in a closing part of the lamp housing 102.

The lamp lens 101 is made of, for example, a light transmissive resin member or a glass member. The lamp lens 101 has a hollow shape with one side open and the other side closed. A periphery of an opening of the lamp lens 101 and a periphery of an opening of the lamp housing 102 are fixed in a watertight state. A lamp chamber 104 is formed by the lamp housing 102 and the lamp lens 101.

(Description of Light Source Unit 1)

In this example, the light source unit 1 is a light source unit that is used as both a daytime running lamp and a clearance lamp, or a light source unit that is used as both a high beam lamp and a low beam lamp. Herein, the light intensity (luminous flux, lumen: lm) of the daytime running lamp is greater than the light intensity of the clearance lamp. In addition, the light intensity of the high-beam lamp is greater than the light intensity of the low-beam lamp.

As illustrated in FIG. 1 to FIG. 4, the light source unit 1 includes a mounting member 2, a substrate 3, a plurality of semiconductor light-emitting element LEDs, two semiconductor light-emitting elements LED1 and LED2 in this example, and a plurality of power supply members, three power supply members (three terminals T1, T2 and T3) in this example, a control circuit 4, and a connector 51 or 52.

The mounting member 2, the substrate 3, the two semiconductor light-emitting elements LED1 and LED2, and the three power supply members T1, T2, and T3 are configured as a socket S that is an integrated structure. The control circuit 4 is configured separately from the socket S, for example, as an LDM (LED Driver Module).

(Description of Mounting Member 2)

Figure 2:
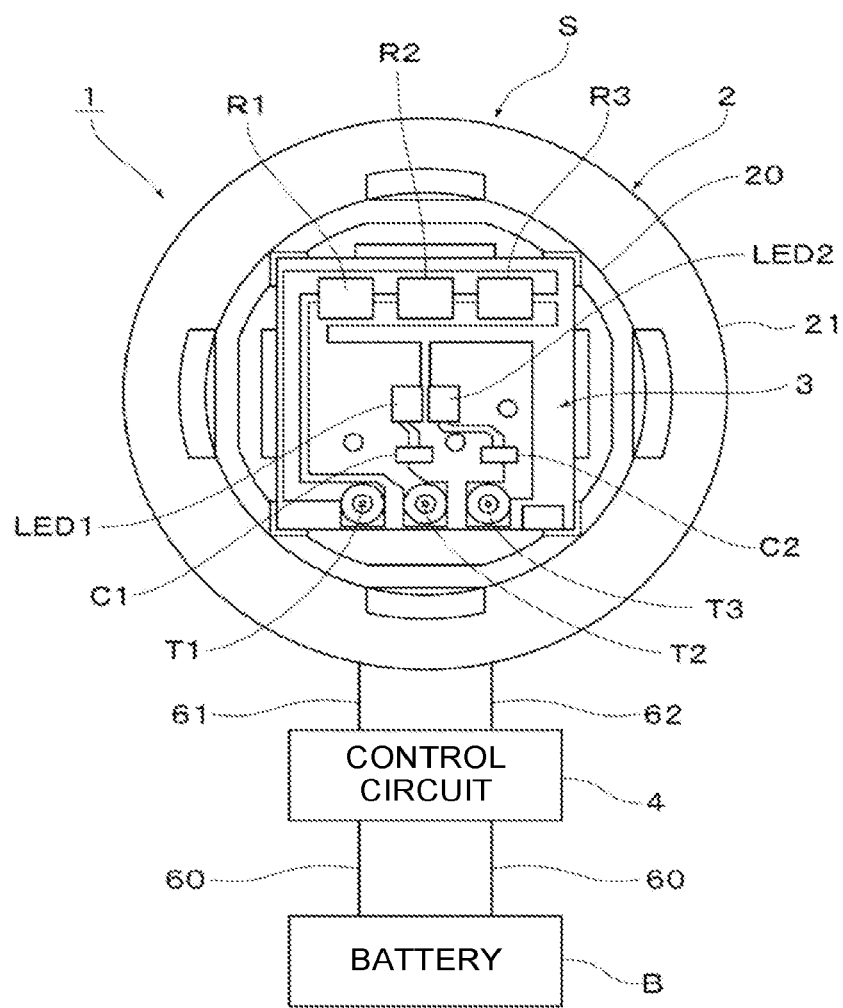
FIG. 2 is a front view illustrating a socket (a view taken along an arrow II in FIG. 1).

As illustrated in FIG. 1 and FIG. 2, the mounting member 2 constitutes a main body portion of the socket S. The mounting member 2 is detachably attached to an edge of the mounting hole 103 of the lamp housing 102 via a packing (O-ring) 105.

Most of the mounting member 2 is composed of a heat radiating member, and has a cylindrical portion 20 on one end portion side, a flange portion 21 on the central portion side, and fin portions 22 on the other end portion side. The cylindrical portion 20 is disposed inside the lamp chamber 104. The flange portion 21 and the fin portions 22 are disposed outside the lamp chamber 104. The flange portion 21 sandwiches the packing 105 together with the edge of the mounting hole 103 of the lamp housing 102 to seal the inside of the lamp chamber 104 in a watertight state.

(Description of Substrate 3)

Figure 3:
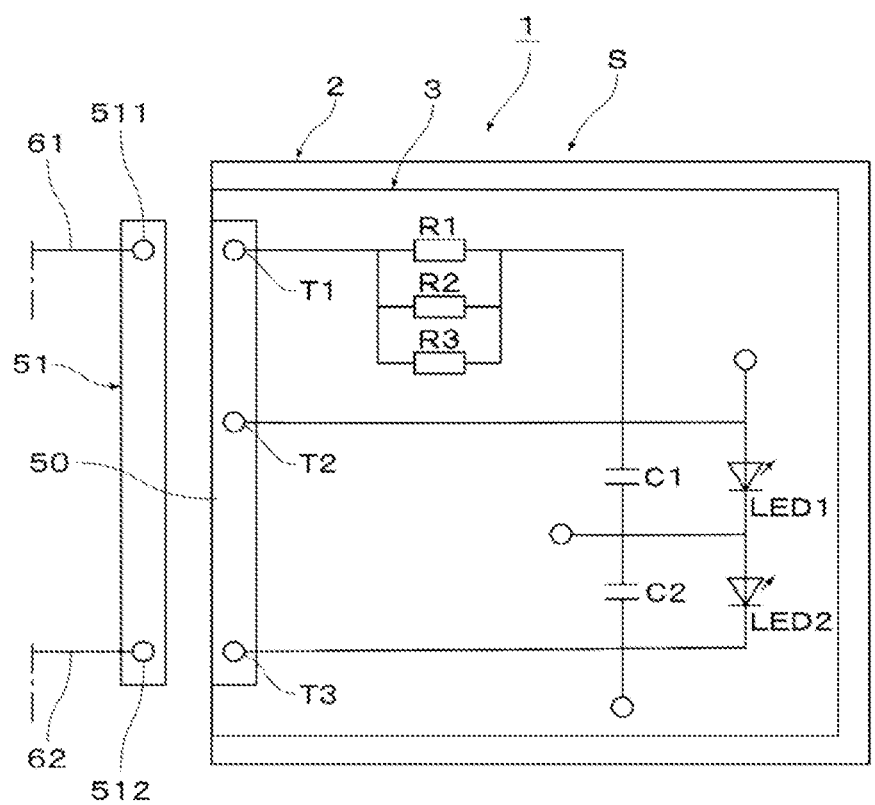
FIG. 3 is an electric circuit diagram illustrating a state in which a first terminal and a ground terminal are electrically connected via a first connector.
Figure 4:
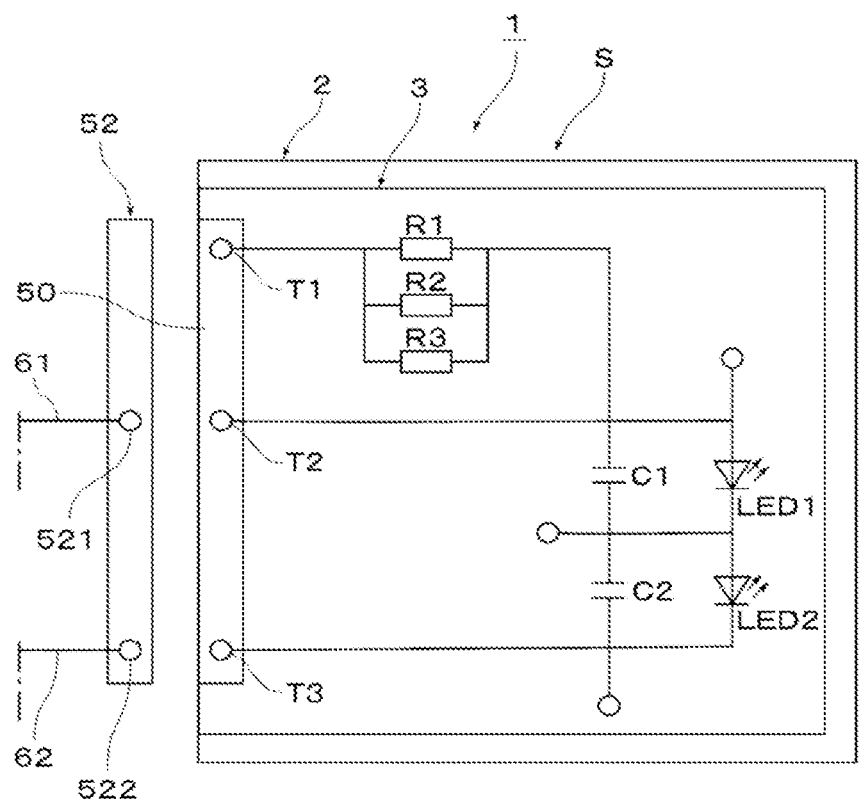
FIG. 4 is an electric circuit diagram illustrating a state in which a second terminal and the ground terminal are electrically connected via a second connector.

As illustrated in FIG. 2, FIG. 3 and FIG. 4, in this example, the substrate 3 has a square plate shape when viewed from the front, and is composed of a ceramic substrate. The substrate 3 is mounted inside the cylindrical portion of the mounting member 2 directly or via a metal plate.

On a front surface of the substrate 3, a plurality of semiconductor light-emitting elements, the two semiconductor light-emitting elements LED1 and LED2 in this example, a plurality of three resistors, the three resistors R1, R2 and R3 in this example, a plurality of capacitors, the two capacitors C1 and C2 in this example are mounted. In addition, a wiring pattern is formed on the front surface of the substrate 3.

(Description of Semiconductor Light-Emitting Elements LED1 and LED2)

As illustrated in FIG. 2, FIG. 3 and FIG. 4, the two semiconductor light-emitting elements LED1 and LED2 are, for example, LED chips, and are mounted on a central portion of the front surface of the substrate 3.

(Description of Three Power Supply Members T1, T2 and T3)

As illustrated in FIG. 2, FIG. 3 and FIG. 4, one portions of the three power supply members T1, T2 and T3 are mounted on the mounting member 2 and the substrate 3, and are electrically connected to the two semiconductor light-emitting elements LED1 and LED2 via the three resistors R1, R2 and R3, the two capacitors C1 and C2 and the wiring pattern.

The three power supply members T1, T2 and T3 are composed of a first terminal T1, a second terminal T2, and a third terminal T3. Hereinafter, the three power supply members T1, T2 and T3 are referred to as the three terminals T1, T2 and T3.

The first terminal T1 supplies power to the two semiconductor light-emitting elements LED1 and LED2 via the three resistors R1, R2 and R3, as described below. The second terminal T2 supplies power to the two semiconductor light-emitting elements LED1 and LED2 directly without going through the three resistors R1, R2 and R3, as described below. The third terminal T3 is a common ground terminal.

An insulating member is interposed between the three terminals T1, T2 and T3 and the mounting member 2, and the three terminals T1, T2 and T3 and the mounting member 2 are insulated from each other and integrated. The other end portions of the three terminals T1, T2 and T3 and a portion of the fin portions 22 of the mounting member 2 form a connector unit 50 of the socket S. The connector unit 50 is disposed outside the lamp chamber 104.

(Description of Control Circuit 4)

As illustrated in FIG. 1, the control circuit 4 is electrically connected to the light source unit 1 via the connector unit 50 of the socket S, the connector 51 or 52, and harnesses 61 and 62. The control circuit 4 supplies a constant current to the light source unit 1. The control circuit 4 operates at a predetermined operating voltage (about 7 V in this example) or more and does not operate below the predetermined operating voltage. That is, the control circuit 4 controls a daytime running lamp and a clearance lamp, as well as a high beam lamp and a low beam lamp, and therefore restriction of the above predetermined operating voltage occurs.

Herein, in the light source unit 1, in a case where the forward voltage of one semiconductor light-emitting element is 3 V, the forward voltage of the two semiconductor light-emitting elements LED1 and LED2 is 6 V. In this state, the control circuit 4 does not operate, and the two semiconductor light-emitting elements LED1 and LED2 of the light source unit 1 do not light up. Therefore, in light source unit 1, it is necessary to connect the two semiconductor light-emitting elements LED1 and LED2 to the three resistors R1, R2 and R3 (see FIG. 3). On the other hand, in a case where the two or more light source units 1 are disposed in the vehicle lamp 100, the voltage is 6 V×2=12 V or more, and therefore the two semiconductor light-emitting elements LED1 and LED2 do not need to be connected to the three resistors R1, R2 and R3 (see FIG. 4).

As illustrated in FIG. 1, the control circuit 4 is disposed inside the lamp chamber 104. The control circuit 4 disposed inside the lamp chamber 104 is electrically connected to a battery B via a harness 60. The battery B is disposed outside the lamp chamber 104. The harness 60 is wired between the inside and the outside of the lamp chamber 104 via a grommet G attached to the lamp housing 102 in a watertight state. The battery B is a 12 V power supply.

(Description of Connector 51 or 52)

As illustrated in FIG. 1, FIG. 3 and FIG. 4, the connector 51 or 52 electrically connects the three terminals T1, T2 and T3 to the control circuit 4 via the connector unit 50 of the socket S. The connector 51 or 52 and the connector unit 50 of the socket S form a waterproof structure.

The connector 51 or 52 electrically connects the three terminals T1, T2 and T3 of the connector unit 50 disposed outside the lamp chamber 104, and the control circuit 4 disposed inside the lamp chamber 104 via harnesses 61 and 62. These harnesses 61 and 62 are wired between the inside and the outside of the lamp chamber 104 via the grommet G attached to the lamp housing 102 in a watertight state, like the harness 60 described above. The harnesses 61 and 62 are composed of a power supply side harness 61 and a ground side harness 62.

The connector 51 or 52 is composed of a first connector 51 or a second connector 52.

As illustrated in FIG. 3, the first connector 51 has a power supply side terminal 511 and a ground side terminal 512. The power supply side terminal 511 is connected to the power supply side harness 61, and is detachably connected to the first terminal T1. The ground side terminal 512 is connected to the ground side harness 62, and is detachably connected to the ground terminal T3. Consequently, the first connector 51 electrically connects the first terminal T1 and the ground terminal T3 to the control circuit 4.

As illustrated in FIG. 4, the second connector 52 has a power supply side terminal 521 and a ground side terminal 522. The power supply side terminal 521 is connected to the power supply side harness 61, and is detachably connected to the second terminal T2. The ground side terminal 522 is connected to the ground side harness 62, and is detachably connected to the ground terminal T3. Consequently, the second connector 52 electrically connects the second terminal T2 and the ground terminal T3 to the control circuit 4.

(Description of Electric Circuit of Substrate 3)

As illustrated in FIG. 2, FIG. 3 and FIG. 4, on the substrate 3, an electric circuit composed of the two semiconductor light-emitting elements LED1 and LED2, the three terminals T1, T2 and T3, the three resistors R1, R2 and R3, the two capacitors C1 and C2, and the wiring pattern is formed.

The two semiconductor light-emitting elements LED1 and LED2 are disposed on the central portion of the front surface of the substrate 3. The three terminals T1, T2 and T3 are mounted on a lower edge portion of the substrate 3. The three resistors R1, R2 and R3 are provided on an upper edge portion of the substrate 3. As a result, the three terminals T1, T2 and T3 and the three resistors R1, R2 and R3 are disposed on the top and the bottom with the two semiconductor light-emitting elements LED1 and LED2 therebetween on the substrate 3.

The three resistors R1, R2 and R3 are connected to the first terminal T1. The three resistors R1, R2 and R3 drop (reduce) a voltage between the first terminal T1 and the ground terminal T3 more than a voltage between the second terminal T2 and the ground terminal T3.

The two capacitors C1 and C2 are provided below the central portion of the substrate 3. The two capacitors C1 and C2 prevent the two semiconductor light-emitting elements LED1 and LED2 from erroneously emitting light due to noise from a power supply line. The power supply line includes the harnesses 60, 61 and 62 and the like.

(Description of Action of First Embodiment)

The light source unit 1 and the vehicle lamp 100 according to the this first embodiment are configured as described above, and the action thereof will be described in the following.

As illustrated in FIG. 3, the first connector 51 is detachably mounted on the connector unit 50 of the socket S. Then, the power supply side terminal 511 of the first connector 51 and the first terminal T1 of the connector unit 50 are electrically connected to each other, and the ground side terminal 512 of the first connector 51 and the ground terminal T3 of the connector unit 50 are electrically connected to each other.

As a result, a current flows as follows: control circuit 4→power supply side harness 61→power supply side terminal 511→first terminal T1→three resistors R1, R2 and R3→two semiconductor light-emitting elements LED1 and LED2→ground terminal T3→ground side terminal 512→ground side harness 62→control circuit 4. Consequently, the two semiconductor light-emitting elements LED1 and LED2 emit light.

As illustrated in FIG. 4, the second connector 52 is detachably mounted on the connector unit 50 of the socket S. Then, the power supply side terminal 521 of the second connector 52 and the second terminal T2 of the connector unit 50 are electrically connected to each other, and the ground side terminal 522 of the second connector 52 and the ground terminal T3 of the connector unit 50 are electrically connected to each other.

As a result, a current flows as follows: control circuit 4→power supply side harness 61→power supply side terminal 521→second terminal T2→two semiconductor light-emitting elements LED1 and LED2→ground terminal T3→ground side terminal 522→ground side harness 62→control circuit 4. Consequently, the two semiconductor light-emitting elements LED1 and LED2 emit light.

Herein, in a case where the forward voltage of the two semiconductor light-emitting elements LED1 and LED2 of the light source unit 1 is less than the operating voltage of the control circuit 4, for example, in a case where the one light source unit 1 is disposed in the vehicle lamp 100, the first connector 51 is connected to the connector unit 50 of the socket S as illustrated in FIG. 3. A current is then supplied to the two semiconductor light-emitting elements LED1 and LED2 via the three resistors R1, R2 and R3. As a result, the forward voltage of the two semiconductor light-emitting elements LED1 and LED2 is not more than the predetermined operating voltage, but the voltage of the one light source unit 1 is not lower than a predetermined operating voltage, and therefore the control circuit 4 operates, and the two semiconductor light-emitting elements LED1 and LED2 of the one light source unit 1 emit light.

On the other hand, in a case where the forward voltage of the two semiconductor light-emitting elements LED1 and LED2 of the light source unit 1 is not lower than the operating voltage of the control circuit 4, for example, in a case where the two light source units 1 are disposed in the vehicle lamp 100, the second connector 52 is connected to the connector unit 50 of the socket S as illustrated in FIG. 4. Then, a current is supplied directly to the two semiconductor light-emitting elements LED1 and LED2 without going through the three resistors R1, R2 and R3. As a result, even when the forward voltage of the two semiconductor light-emitting elements LED1 and LED2 is not more than the predetermined operating voltage, the voltage of the two light source units 1 is not less than the predetermined operating voltage, and therefore the control circuit 4 operates, and the two semiconductor light-emitting elements LED1 and LED2 of the two or more light source units 1 emit light respectively.

(Description of Effects of First Embodiment)

The light source unit 1 and the vehicle lamp 100 according to this first embodiment have the above configuration and action, and their effects will be described in the following.

In the light source unit 1 and the vehicle lamp 100 according to this first embodiment, while the mounting member 2, the substrate 3, the two semiconductor light-emitting elements LED1 and LED2, and the three terminals T1, T2 and T3 are configured as the socket S which is an integrated structure, the control circuit 4 is configured separately from the socket S.

As a result, the light source unit 1 and the vehicle lamp 100 according to this first embodiment can shield the semiconductor light-emitting elements LED1 and LED2 on the socket S side, which are separated from the control circuit 4, from heat of the control circuit 4. Consequently, the light source unit 1 and the vehicle lamp 100 according to this first embodiment can increase a current value to be supplied to the semiconductor light-emitting elements LED1 and LED2, and the brightness of the lamp can be increased accordingly. For example, the light source unit 1 and the vehicle lamp 100 according to this first embodiment can increase the light intensity of the semiconductor light-emitting elements LED1 and LED2 by about 20% or more compared to the light source module in PTL 1. Thus, in the light source unit 1 and the vehicle lamp 100 according to this first embodiment, it is possible to further improve the luminous efficiency of the semiconductor light-emitting elements LED1 and LED2.

In the light source unit 1 and the vehicle lamp 100 according to this first embodiment, since the control circuit 4 is separated from the substrate 3 of the socket S, the socket S only needs to release the heat of the semiconductor light-emitting elements LED1 and LED2 to the outside, as the socket S, and therefore the socket S can be made smaller. That is, in the case of a socket that releases the heat of the semiconductor light-emitting element and the heat of the control circuit to the outside, the size increases. In particular, as the light intensity of the semiconductor light-emitting element increases, the heat of the semiconductor light-emitting element tends to rise and the size tends to increase. On the other hand, the light source unit 1 and the vehicle lamp 100 according to this first embodiment each have the socket S that releases the heat of the semiconductor light-emitting elements LED1 and LED2 to the outside, and therefore it is possible to reduce the size of the socket S.

In each of the light source unit 1 and the vehicle lamp 100 according to this first embodiment, the control circuit 4 is separated from the substrate 3 of the socket S, and therefore the area for mounting the parts and the area for forming the electric circuit on the substrate 3 can be expanded by separating the control circuit 4. As a result, in each of the light source unit 1 and the vehicle lamp 100 according to this first embodiment, is it possible to mount the terminals T1, T2 and T3 on the substrate 3 by adding the terminals T1, T2 and T3, and form the light source unit 1 or the vehicle lamp 100 by adding an electric circuit. Consequently, with each of the light source unit 1 and the vehicle lamp 100 according to this first embodiment, the one light source unit 1 can be used in combination with two lamps with different lamp functions.

In the light source unit 1 and the vehicle lamp 100 according to this first embodiment, the control circuit 4 has an operating voltage for operating when the forward voltage of the semiconductor light-emitting elements LED1 and LED2 is a predetermined value, and in a case where a plurality of the light source units 1 are installed, the operating voltage of the control circuit 4 exceeds the predetermined value. As a result, the light source unit 1 and the vehicle lamp 100 according to this first embodiment can each use an existing control circuit as the control circuit 4, and therefore a manufacturing cost can be reduced accordingly.

In each of the light source unit 1 and the vehicle lamp 100 according to this first embodiment, the three terminals T1, T2 and T3 added and mounted on the substrate 3 are composed of the first terminal T1 that supplies power to the semiconductor light-emitting elements LED1 and LED2 via the resistors R1, R2 and R3, the second terminal T2 that directly supplies power to the semiconductor light-emitting elements LED1 and LED2 without going through the resistors R1, R2 and R3, and the common ground terminal T3. In addition, in each of the light source unit 1 and the vehicle lamp 100 according to this first embodiment, the connectors 51 and 52 are composed of the first connector 51 that connects the first terminal T1 and the ground terminal T3 to the control circuit 4, or the second connector 52 that connects the second terminal T2 and the ground terminal T3 to the control circuit 4.

As a result, as described above, in each of the light source unit 1 and the vehicle lamp 100 according to this first embodiment, since the control circuit 4 is separated from the substrate 3 of socket S, the substrate 3 can be shielded from the heat of control circuit 4, and therefore the current to be supplied to the semiconductor light-emitting elements LED1 and LED2 can be increased, and the brightness of the lamp can be increased accordingly.

In each of the light source unit 1 and the vehicle lamp 100 according to this first embodiment, in a case where the forward voltage of the two semiconductor light-emitting elements LED1 and LED2 of the light source unit 1 is less than the predetermined operating voltage of the control circuit 4, for example, in a case where the one light source unit 1 is disposed in the vehicle lamp 100, as illustrated in FIG. 3, the first connector 51 is connected to the connector unit 50 of the socket S. Then, a current is supplied to the two semiconductor light-emitting elements LED1 and LED2 via the three resistors R1, R2 and R3, and therefore in the forward voltage of the two semiconductor light-emitting elements LED1 and LED2 is not more than the predetermined operating voltage, but the voltage of the one light source unit 1 is not less than the predetermined operating voltage, and therefore the control circuit 4 operates, and the two semiconductor light-emitting elements LED1 and the LED2 of the one light source unit 1 emit light.

Further, in each of the light source unit 1 and the vehicle lamp 100 according to this first embodiment, when the forward voltage of the two semiconductor light-emitting elements LED1 and LED2 of the light source unit 1 is not lower than the predetermined operating voltage of the control circuit 4, for example, when the two or more light source units 1 are disposed in the vehicle lamp 100, as illustrated in FIG. 4, the second connector 52 is connected to the connector unit 50 of the socket S. Then, the current is directly supplied to the two semiconductor light-emitting elements LED1 and LED2 without going through the three resistors R1, R2 and R3, and therefore even when the forward voltage of the two semiconductor light-emitting elements LED1 and LED2 is not more than the predetermined operating voltage, the voltage of the two light source units 1 is not less than predetermined operating voltage, and therefore the control circuit 4 operates, and the two semiconductor light-emitting elements LED1 and LED2 of the two or more light source units 1 each emit light.

As a result, in each of the light source unit 1 and the vehicle lamp 100 according to this first embodiment, the common socket S and the control circuit 4 can be used as the socket S and the control circuit 4, respectively. Consequently, in each of the light source unit 1 and the vehicle lamp 100 according to this first embodiment, it is possible to reduce a manufacturing cost.

In each of the light source unit 1 and the vehicle lamp 100 according to this first embodiment, the control circuit 4 controls a low beam lamp unit and a high beam lamp unit. As a result, in each of the light source unit 1 and the vehicle lamp 100 according to this first embodiment, the control circuit 4 can also be used as a control circuit for the low beam lamp unit and the high beam lamp unit, and can be made common. Consequently, in each of the light source unit 1 and the vehicle lamp 100 according to this first embodiment, it is possible to reduce a manufacturing cost.

In each of the light source unit 1 and the vehicle lamp 100 according to this first embodiment, the semiconductor light-emitting elements LED1 and LED2 are mounted on the central portion of the substrate 3, the terminals T1, T2 and T3 are mounted on the lower edge portion of the substrate 3, and the resistors R1, R2 and R3 are provided on the upper edge portion of the substrate 3. That is, in each of the light source unit 1 and the vehicle lamp 100 according to this first embodiment, the three terminals T1, T2 and T3 and the three resistors R1, R2 and R3 are disposed on the top and the bottom with the two semiconductor light-emitting elements LED1 and LED2 therebetween.

As a result, in each of the light source unit 1 and the vehicle lamp 100 according to this first embodiment, spaces between the semiconductor light-emitting elements LED1 and LED2, and the terminals T1, T2 and T3 and the resistors R1, R2 and R3 can be widened. Consequently, in each of the light source unit 1 and the vehicle lamp 100 according to this first embodiment, a complex electric circuit can be formed between the semiconductor light-emitting elements LED1 and LED2, and the terminals T1, T2 and T3 and the resistors R1, R2 and R3.

In each of the light source unit 1 and the vehicle lamp 100 according to this first embodiment, the semiconductor light-emitting elements LED1 and LED2 are mounted on the central portion of the substrate 3, and therefore light from the semiconductor light-emitting elements LED1 and LED2 can be controlled easily and accurately, compared to a case where the semiconductor light-emitting elements LED1 and LED2 are mounted on an edge of the substrate 3. The semiconductor light-emitting elements LED1 and LED2 emit white light or amber light, or white light and amber light.

In each of the light source unit 1 and the vehicle lamp 100 according to this first embodiment, the resistors R1, R2 and R3 are provided in the upper edge portion of the substrate 3, that is, a portion above the semiconductor light-emitting elements LED1 and LED2, and therefore due to the action of an updraft, the semiconductor light-emitting elements LED1 and LED2 can be shielded from the heat of the resistors R1, R2 and R3, and the luminous efficiency of the semiconductor light-emitting elements LED1 and LED2 can be improved.

In the vehicle lamp 100 according to this first embodiment, the flange portion 21 and the fin portions 22 of the socket S of the light source unit 1 are disposed outside the lamp chamber 104, and therefore the heat radiation effect of the light source unit 1 is improved.

In the vehicle lamp 100 according to this first embodiment, the control circuit 4 is disposed inside the lamp chamber 104, and therefore the control circuit 4 can be protected from the environment outside the lamp chamber 104, and the performance of the control circuit 4 is improved.

(Description of Configuration, Action, and Effects of Second Embodiment)

Figure 5:
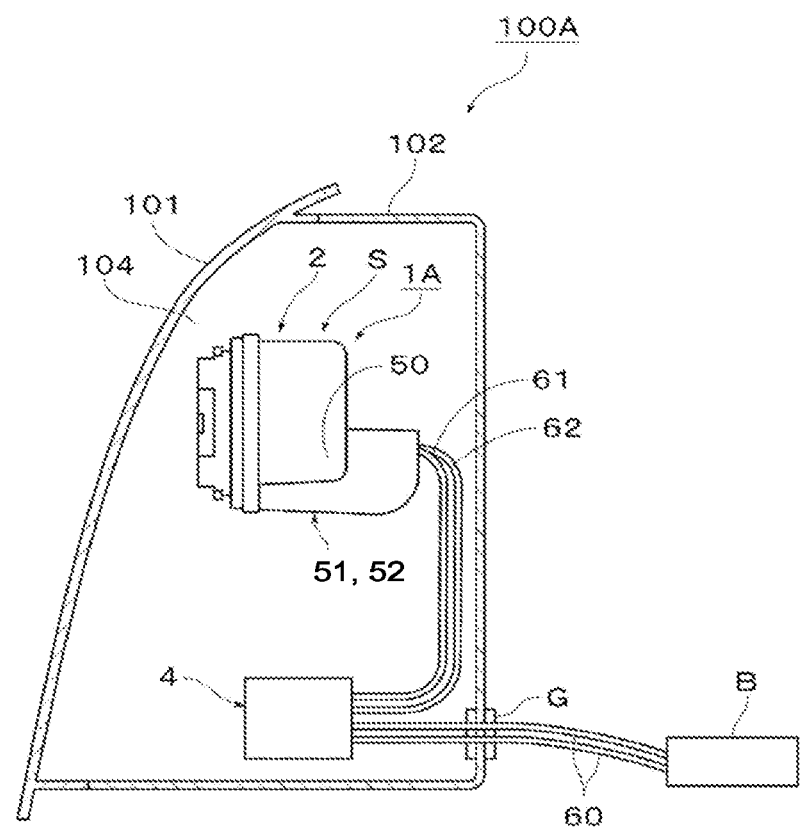
FIG. 5 is a schematic vertical cross-sectional view (a schematic vertical cross-sectional view corresponding to FIG. 1) of a use state illustrating a second embodiment of the light source unit for a vehicle lamp and a vehicle lamp according to the present invention.
Figure 6:
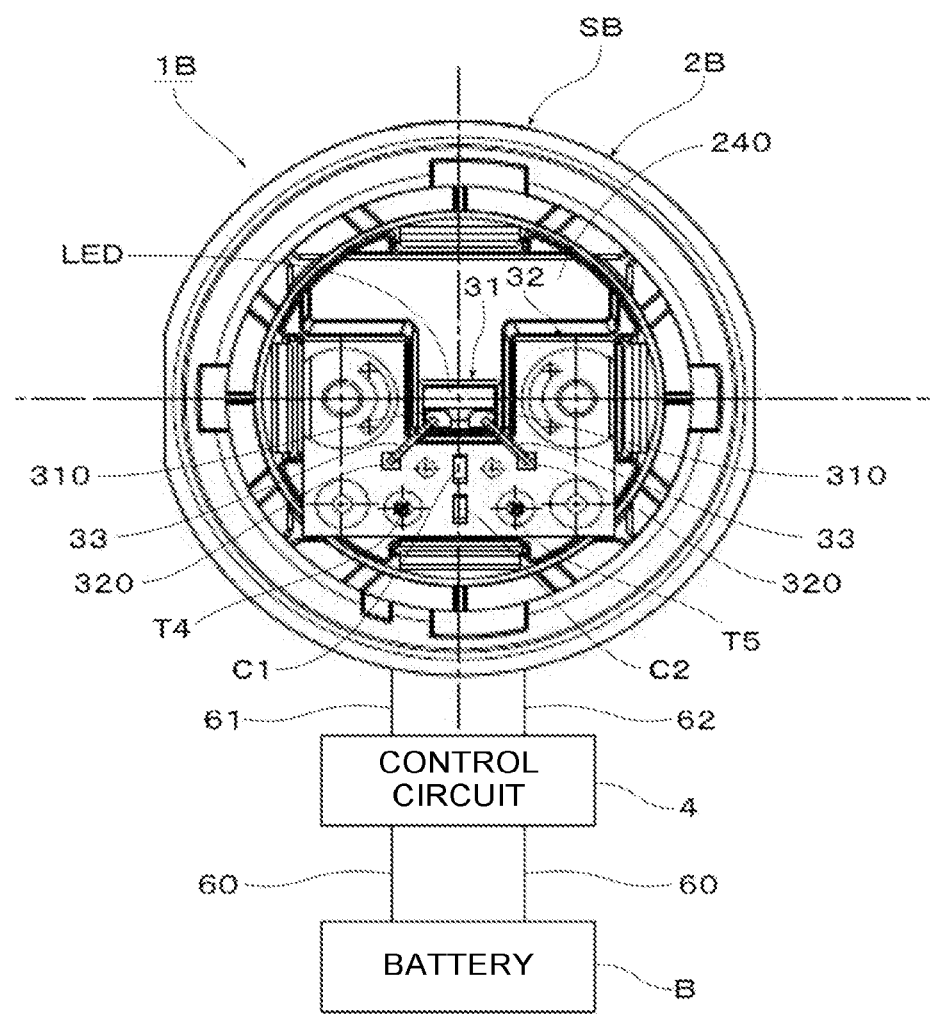
FIG. 6 is a front view (a front view corresponding to FIG. 2) of a socket illustrating a third embodiment of the light source unit for a vehicle lamp and a vehicle lamp according to the present invention.
Figure 7:
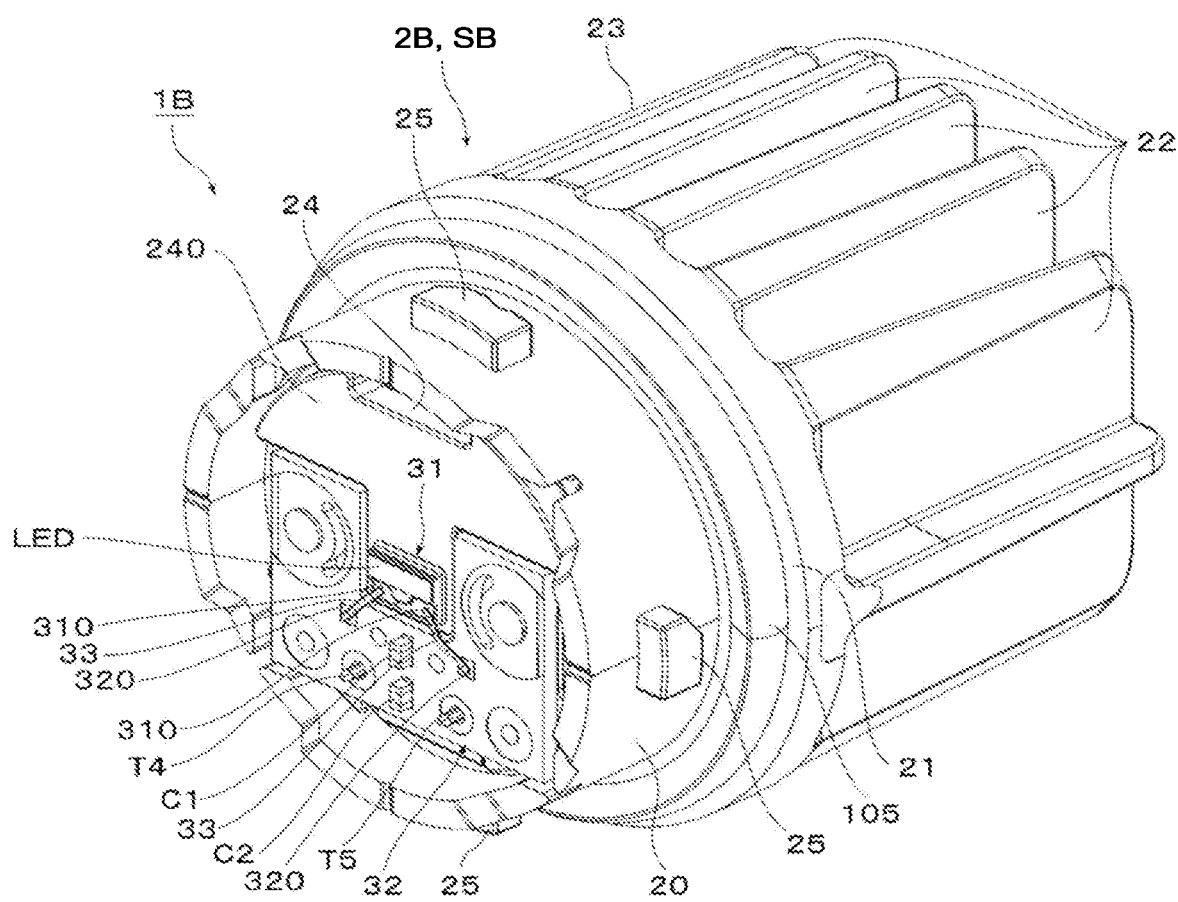
FIG. 7 is a perspective view illustrating the socket.

FIG. 5 illustrates a second embodiment of the light source unit for a vehicle lamp and the vehicle lamp according to the present invention. Hereinafter, a configuration, action and an effect of a light source unit 1A for a vehicle lamp and a vehicle lamp 100A according to this second embodiment will be described. In the drawing, the same reference numerals as those in FIG. 1 to FIG. 4 denote the same components.

In each of the light source unit 1 for a vehicle lamp and the vehicle lamp 100 according to the above first embodiment, the cylindrical portion 20 on the semiconductor light-emitting elements LED1 and LED2 side of the socket S is disposed inside the lamp chamber 104, and the flange portion 21 and the fin portions 22 on the terminals T1, T2 and T3 side of the socket S are disposed outside the lamp chamber 104. On the other hand, in each of the light source unit 1A for a vehicle lamp and the vehicle lamp 100A according to this second embodiment, the entire socket S is disposed inside the lamp chamber 104.

The light source unit 1A for a vehicle lamp and the vehicle lamp 100A according to this second embodiment are configured as described above, and therefore it is possible to achieve the same action effect as the light source unit 1 for a vehicle lamp and the vehicle lamp 100 according to the above first embodiment.

In particular, in the vehicle lamp 100A according to this second embodiment, the entire socket S of the light source unit 1A is disposed inside the lamp chamber 104, and therefore the light source unit 1A can be protected from the environment outside the lamp chamber 104, and performance of the light source unit 1A is improved.

(Description of Configuration of Third Embodiment)

FIG. 6 to FIG. 9 each illustrate a third embodiment of the light source unit for a vehicle lamp according to the present invention. Hereinafter, a configuration of a light source unit 1B for a vehicle lamp according to this third embodiment will be described. In the drawing, the same reference numerals as those in FIG. 1 to FIG. 5 denote the same components.

As illustrated in FIG. 6 to FIG. 9, the light source unit 1B for a vehicle lamp according to this third embodiment includes a mounting member 2B, two substrates 31 and 32, a semiconductor light-emitting element (light emitting chip) LED, a plurality of power supply members, two power supply members in this example, two terminals T4 and T5, a control circuit 4, and a connector 54, almost similar to the light source units 1 and 1A for a vehicle lamp according to the first and second embodiments. The semiconductor light-emitting element LED has a plurality of light emitting chips in this example. The two terminals T4 and T5 are composed of a power supply terminal T4 and a ground terminal T5.

The mounting member 2B, the two substrates 31 and 32, the semiconductor light-emitting element LED and the two terminals T4 and T5 are configured as a socket SB that is an integrated structure. The control circuit 4 is configured separately from the socket SB, for example, as an LDM (LED Driver Module).

In each of the light source units 1 and 1A for a vehicle lamp according to the above first and second embodiments, the semiconductor light-emitting elements LED1 and LED2 are mounted on the one substrate 3, and the terminals T1, T2 and T3 of the power supply member are mounted, the semiconductor light-emitting elements LED1 and LED2, the terminals T1, T2 and T3 are electrically connected to each other via the one substrate 3.

On the other hand, in the light source unit 1B for a vehicle lamp according to this third embodiment, the substrate is divided into two substrates, namely, a submount substrate 31 as a first substrate mounted with the semiconductor light-emitting element LED, and a circuit substrate 32 as a second substrate mounted with the two terminals T4 and T5 of the power supply member, and the semiconductor light-emitting element LED and the terminals T4 and T5 are electrically connected to each other via the two substrate 31 and 32.

(Description of Submount Substrate 31 and Circuit Substrate 32)

Figure 8:
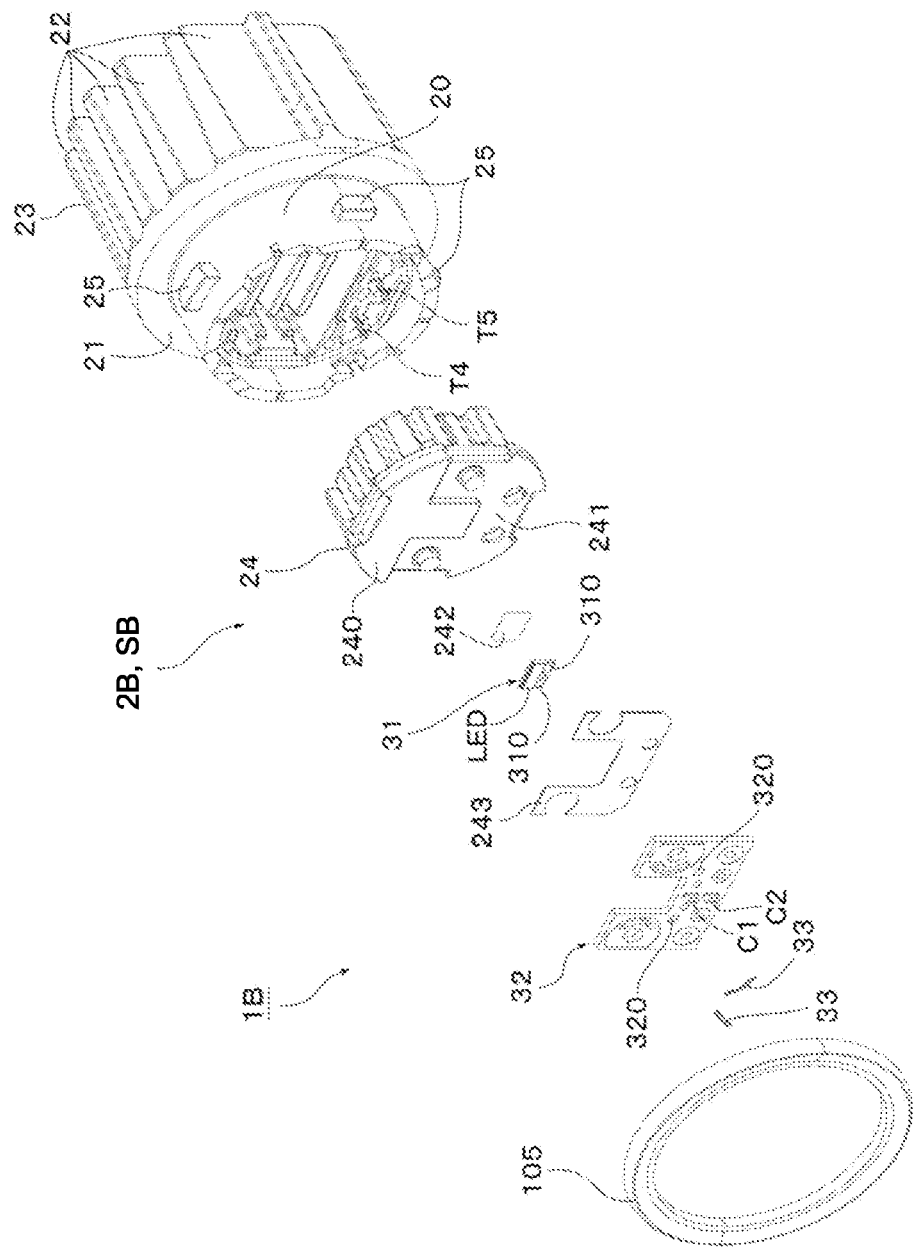
FIG. 8 is an exploded perspective view illustrating the socket.

As illustrated in FIG. 8, one substrate is divided into two, one of the substrates is defined as the submount substrate 31 as the first substrate, and the other is defined as the circuit substrate 32 as the second substrate. The front view of the submount substrate 31 has a horizontally long small rectangular shape, and the front view of the circuit substrate 32 has a concave shape.

The semiconductor light-emitting element (light emitting chip) LED is attached to (mounted on) the upper half of a front (front) mounting surface of the submount substrate 31. Two connection terminals 310 are provided at the two lower corners of the mounting surface of the submount substrate 31. The semiconductor light-emitting element LED and the two connection terminals 310 are electrically connected to each other via wires on the submount substrate 31. Consequently, the semiconductor light-emitting element LED is mounted and electrically connected to the submount substrate 31 as the first substrate. A back surface (rear surface) of the submount substrate 31 is mounted on a projecting surface part 240, described below, of the mounting member 2B via an adhesive layer 242.

The two terminals T4 and T5, two connection terminals 320 and two capacitors C1 and C2 are attached to (mounted on) the circuit substrate 32. The two terminals T4 and T5, the two connection terminals 320 and the two capacitors C1 and C2 are electrically connected to each other via wires on the circuit substrate 32.

Consequently, the two capacitors C1 and C2 are mounted and electrically connected to a bottom center of the circuit substrate 32 as the second substrate. The two terminals T4 and T5 are mounted and electrically connected to the left and right sides of the two capacitors C1 and C2 under the circuit substrate 32 as the second substrate. The back surface (rear surface) of the circuit substrate 32 is mounted on a recessed surface part 241, described below, of the mounting member 2B via an adhesive layer 243.

The two connection terminals 310 of the submount substrate 31 and the two connection terminals 320 of the circuit substrate 32 are electrically connected to each other by bonding wires 33. Consequently, the semiconductor light-emitting element LED and the terminals T4 and T5 are electrically connected to each other via the submount substrate 31 and the circuit substrate 32.

(Description of Mounting Member 2B)

As illustrated in FIG. 8, the mounting member 2B includes a socket member 23 and a heat radiating member (heat sink member) 24. The socket member 23 is made of a material with thermal conductivity, a resin material in this example. The heat radiating member 24 is composed of a metal member or resin member with high thermal conductivity. Fin groove parts of the socket member 23 and heat radiation fin parts of the heat radiating member 24 are fitted and attached to each other via thermal conductive grease.

The socket member 23 has a cylindrical portion 20 on one end side, a flange portion 21 on a central portion, fin portions 22 on the other end side, and a mounting projection (bayonet) 25 provided on the cylindrical portion 20. The flange portion 21 and the mounting projection 25 sandwich an edge of the mounting hole 103 of the lamp housing 102 together with the packing 105 to seal the inside of the lamp chamber 104 in a watertight state.

The two terminals T4 and T5 are mounted on the socket member 23 in an insulated state. One end portions of the two terminals T4 and T5 and a portion of the socket member 23 form a connector unit 53 of the socket SB.

The projecting surface part 240 and the recessed surface part 241 are provided on a front (front) installation surface of the heat radiating member 24. The projecting surface part 240 has a T shape when viewed from the front, and the recessed surface part 241 has a concave shape when viewed from the front like the shape of the circuit substrate 32 when viewed from the front.

The back surface (rear surface) of the submount substrate 31 is mounted on a lower end of the projecting surface part 240 via the adhesive layer 242. Consequently, the semiconductor light-emitting element LED of the submount substrate 31 is disposed in a central portion of the installation surface of the heat radiating member 24. The back surface (rear surface) of the circuit substrate 32 is attached to the entire recessed surface part 241 via the adhesive layer 243. Consequently, the two terminals T4 and T5 and the two capacitors C1 and C2 are disposed on a lower part of the installation surface of the heat radiating member 24.

The other end portions of the two terminals T4 and T5 are inserted through the heat radiating member 24 and the circuit substrate 32 and crimped to the circuit substrate 32. Consequently, the circuit substrate 32 is securely attached to the heat radiating member 24.

(Description of Connector 54)

Figure 9:
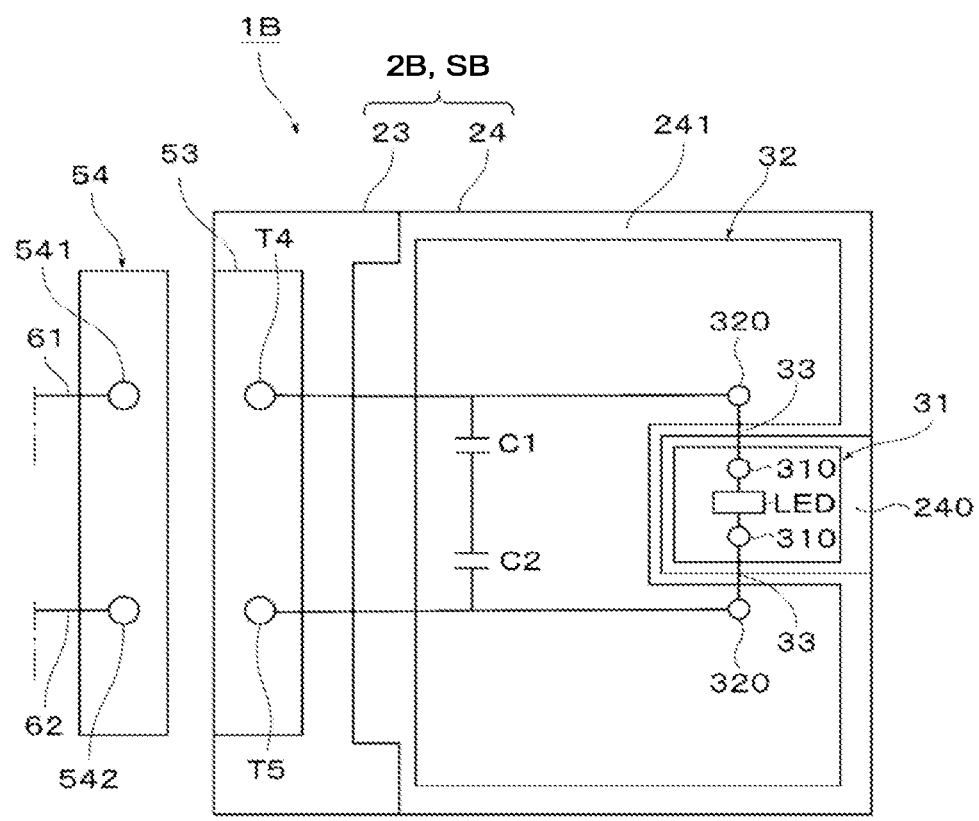
FIG. 9 is an electric circuit diagram illustrating a state in which a power terminal and the ground terminal are electrically connected via a connector.

As illustrated in FIG. 9, the connector 54 electrically connects the two terminals T4 and T5 to the control circuit 4 via the connector unit 53 of the socket SB. In addition, the connector 54 electrically connects the two terminals T4 and T5 to the control circuit 4 via the harnesses 61 and 62.

The connector 54 has a power supply side terminal 541 and a ground side terminal 542. The power supply side terminal 541 is connected to the power supply side harness 61, and is detachably connected to the power supply terminal T4. The ground side terminal 542 is connected to the ground side harness 62, and is detachably connected to the ground terminal T5. Consequently, the connector 54 electrically connects the power supply terminal T4 and the ground terminal T5 to the control circuit 4.

(Description of Action of Third Embodiment)

The light source unit 1B according to this third embodiment is configured as described above, and the action will be described in the following.

As illustrated in FIG. 9, the connector 54 is detachably attached to the connector unit 53 of the socket SB. Then, the power supply side terminal 541 of the connector 54 and the power supply terminal T4 of the connector unit 53 are electrically connected to each other, and the ground side terminal 542 of the connector 54 and the ground terminal T5 of the connector unit 53 are electrically connected to each other.

As a result, a current flows as follows: control circuit 4→power supply side harness 61→power supply side terminal 541→power supply terminal T4→semiconductor light-emitting element LED→ground terminal T5→ground side terminal 542→ground side harness 62→control circuit 4. Consequently, a large number of light emitting chips of the semiconductor light-emitting element LED emit light.

In this third embodiment, the semiconductor light-emitting element LED mounted on the submount substrate 31 has a plurality of the light emitting chips. As a result, even when the forward voltage of the one light emitting chip of the semiconductor light-emitting element LED is not higher than a predetermined operating voltage, when a current is directly supplied to a large number of the light emitting chips of the semiconductor light-emitting element LED without going through a resistor, the forward voltage of a large number of the light emitting chips of the semiconductor light-emitting element LED becomes the predetermined operating voltage or more. Consequently, the control circuit 4 operates, and a large number of the light emitting chips of the semiconductor light-emitting element LED mounted on the submount substrate 31 emit light. At this time, a plurality of the light emitting chips of the semiconductor light-emitting element LED emit white light or amber light, or both white light and amber light.

(Description of Effect of Third Embodiment)

The light source unit 1B according to this third embodiment has the configuration and action as described above, and therefore it is possible to achieve the same effect as the light source unit 1 according to the above first embodiment.

In particular, in the light source unit 1B according to this third embodiment, one substrate divided into two, the semiconductor light-emitting element LED is mounted on the submount substrate 31 which is the one substrate, and the terminals T4 and T5 of the power supply member are mounted on the circuit substrate 32 which is the other substrate, and therefore the heat radiation effect is improved.

(Description of Modification)

In the above first and second embodiments, an example, in which the semiconductor light-emitting elements LED1 and LED2 are mounted on the one substrate 3 and electrically connected to the one substrate 3, is described. In the above third embodiment, an example, in which the semiconductor light-emitting element LED is mounted on the submount substrate 31 which is one of the divided two substrates, and is electrically connected to the submount substrate 31, is described. Hereinafter, a modification which is an example different from the above first to third embodiments will be described.

The modification is an example in which the semiconductor light-emitting elements LED1 and LED2 are not mounted on the one substrate 3, but directly mounted on the mounting member (heat radiating member) 2, unlike the above first and second embodiments. In addition, the modification is an example in which the semiconductor light-emitting element LED is not mounted on the submount substrate 31 which is one of the divided two substrate, but directly mounted on the heat radiating member 24 of the mounting member 2B, unlike the above third embodiment.

In this modification, with respect to the first and second embodiments, the semiconductor light-emitting elements LED1 and LED2 and the mounting member (heat radiating member) 2 need to be insulated via an insulating member, and the semiconductor light-emitting elements LED1 and LED2 and the substrate 3 mounted on the mounting member (heat radiating member) 2 need to be electrically connected to each other. In this modification, with respect to the above third embodiment, the semiconductor light-emitting element LED and the heat radiating member 24 of the mounting member 2B need to be insulated via an insulating member, and the semiconductor light-emitting element LED and the circuit substrate 32 which is the other of the divided two substrates mounted on the heat radiating member 24 of the mounting member 2B need to be electrically connected to each other.

In this modification, the semiconductor light-emitting elements LED1 and LED2 are directly mounted on the mounting member (heat radiating member) 2, and the semiconductor light-emitting element LED is directly mounted on the heat radiating member 24 of the mounting member 2B, and therefore the heat radiation effect is improved.

(Description of Example other than First, Second and Third Embodiments and Modification)

In the above first, second, and third embodiments, the light source units 1, 1A, 1B, and the vehicle lamps 100, 100A are used in combination with clearance lamps and daytime running lamps, or in combination with low beam lamps and high beam lamps. However, in the present invention, the light source unit for a vehicle lamp, and the vehicle lamp can be used for lamps in combinations other than the lamps in the above combination.

In the above first, second, and third embodiments, the control circuit 4 is disposed inside the lamp chamber 104. However, in the present invention, the control circuit 4 may be disposed outside the lamp chamber 104.

Furthermore, in the above first, second, and third embodiments, the one socket S, SB and the one control circuit 4 are electrically connected to each other via the connector 51 or 52, 54 and the harnesses 61 and 62.

However, in the present invention, a plurality of the sockets S, SB and the one control circuit 4 may be electrically connected to via the connector 51 or 52, 54 and the harnesses 61 and 62.

The present invention is not limited to the above first, second, and third embodiments, and the modification.

DESCRIPTION OF REFERENCE NUMERALS 1, 1A, 1B light source unit (light source unit for a vehicle lamp)
2, 2B mounting member
20 cylindrical portion
21 flange portion
22 fin portion
23 socket member
24 heat radiating member (heat sink member)
240 projecting surface part
241 recessed surface part
242, 243 adhesive layer
25 mounting projection (bayonet)
3 substrate
31 submount substrate (first substrate, one of divided two substrates)
32 circuit substrate (second substrate, the other of divided two substrates)
4 control circuit (LDM)
50 connector unit
51 first connector
511 power supply side terminal
512 ground side terminal
52 second connector
521 power supply side terminal
522 ground side terminal
53 connector unit
54 connector
541 power supply side terminal
542 ground side terminal
60 harness
61 power supply side harness
62 ground side harness
100, 100A vehicle lamp
101 lamp lens
102 lamp housing
103 mounting hole
104 lamp chamber
105 packing
B battery
C1, C2 capacitor
G grommet
LED1, LED2 semiconductor light-emitting element
LED semiconductor light-emitting element (light emitting chip)
R1, R2, R3 resistor
S, SB socket
T1 first terminal (power supply member)
T2 second terminal (power supply member)
T3 ground terminal (power supply member)
T4 power supply terminal (power supply member)
T5 ground terminal (power supply member)

The invention claimed is:

1. A light source unit for a vehicle lamp, the light source unit comprising:
a mounting member mounted on the vehicle lamp;
a substrate mounted on the mounting member;
a semiconductor light-emitting element electrically connected to the substrate;
a power supply member mounted on the mounting member and the substrate and being electrically connected to the semiconductor light-emitting element, the power supply member including at least an electric circuit to drop a voltage, wherein one end of the power supply member is electrically connected to the semiconductor light-emitting element through the electric circuit;
a connector that is arranged to be connected to another end of the power supply member, the another end being opposite to the one end; and
a control circuit that performs control to supply a constant current to the another end of the power supply member, in accordance with a predetermined operating voltage;
wherein the mounting member, the substrate, the semiconductor light-emitting element, and the power supply member are configured as a socket which is an integral structure, the socket including the connector, and
the control circuit is configured separately from the socket and connects to the connector.

2. The light source unit for the vehicle lamp according to claim 1, wherein
the light source unit comprises a plurality of the semiconductor light-emitting elements and a plurality of the power supply members, and
the plurality of semiconductor light-emitting elements are mounted on the substrate.

3. The light source unit for the vehicle lamp according to claim 2, wherein
the electric circuit includes a resistor mounted on the substrate,
the plurality of power supply members include:
a first terminal that supplies power to the plurality of semiconductor light-emitting elements via the electric circuit;
a second terminal that supplies power directly to the plurality of semiconductor light-emitting elements; and
a common ground terminal, and
the connector includes a first connector that electrically connects the first terminal and the ground terminal to the control circuit, or a second connector that electrically connects the second terminal and the ground terminal to the control circuit.

4. The light source unit for the vehicle lamp according to claim 3, wherein
the socket and the control circuit are a common socket and a common control circuit,
in a case where a forward voltage of the semiconductor light-emitting element is less than a predetermined operating voltage of the control circuit, the first terminal and the ground terminal are electrically connected to the control circuit by the first connector, and
in a case where the forward voltage of the semiconductor light-emitting element is not less than the predetermined operating voltage of the control circuit, the second terminal and the ground terminal are electrically connected to the control circuit by the second connector.

5. The light source unit for the vehicle lamp according to claim 4, wherein the control circuit controls a low beam lamp unit and a high beam lamp unit.

6. A vehicle lamp, comprising:
a lamp housing and a lamp lens that form a lamp chamber; and
the light source unit according to claim 5, wherein
in the socket of the light source unit, a portion on a semiconductor light-emitting element side is disposed inside the lamp chamber and a portion on a power supply member side is disposed outside the lamp chamber, or an entire portion is disposed inside the lamp chamber, and
the control circuit is disposed inside or outside the lamp chamber, separately from the socket, and is electrically connected to a battery.

7. A vehicle lamp, comprising:
a lamp housing and a lamp lens that form a lamp chamber; and
the light source unit according to claim 4, wherein
in the socket of the light source unit, a portion on a semiconductor light-emitting element side is disposed inside the lamp chamber and a portion on a power supply member side is disposed outside the lamp chamber, or an entire portion is disposed inside the lamp chamber, and
the control circuit is disposed inside or outside the lamp chamber, separately from the socket, and is electrically connected to a battery.

8. The light source unit for the vehicle lamp according to claim 3, wherein
the plurality of semiconductor light-emitting elements are mounted on a central portion of the substrate,
the plurality of power supply members are mounted on a lower edge portion of the substrate, and
the resistor is provided on an upper edge portion of the substrate.

9. A vehicle lamp, comprising:
a lamp housing and a lamp lens that form a lamp chamber; and
the light source unit according to claim 8, wherein
in the socket of the light source unit, a portion on a semiconductor light-emitting element side is disposed inside the lamp chamber and a portion on a power supply member side is disposed outside the lamp chamber, or an entire portion is disposed inside the lamp chamber, and
the control circuit is disposed inside or outside the lamp chamber, separately from the socket, and is electrically connected to a battery.

10. A vehicle lamp, comprising:
a lamp housing and a lamp lens that form a lamp chamber; and
the light source unit according to claim 3, wherein
in the socket of the light source unit, a portion on a semiconductor light-emitting element side is disposed inside the lamp chamber and a portion on a power supply member side is disposed outside the lamp chamber, or an entire portion is disposed inside the lamp chamber, and
the control circuit is disposed inside or outside the lamp chamber, separately from the socket, and is electrically connected to a battery.

11. The light source unit for the vehicle lamp according to claim 2, wherein
the control circuit has an operating voltage for operating in a case where a forward voltage of the semiconductor light-emitting elements is a predetermined value, and
the operating voltage of the control circuit exceeds the predetermined value in a case where a plurality of the light source units for the vehicle lamp are provided.

12. A vehicle lamp, comprising:
a lamp housing and a lamp lens that form a lamp chamber; and
the light source unit according to claim 11, wherein
in the socket of the light source unit, a portion on a semiconductor light-emitting element side is disposed inside the lamp chamber and a portion on a power supply member side is disposed outside the lamp chamber, or an entire portion is disposed inside the lamp chamber, and
the control circuit is disposed inside or outside the lamp chamber, separately from the socket, and is electrically connected to a battery.

13. A vehicle lamp, comprising:
a lamp housing and a lamp lens that form a lamp chamber; and
the light source unit according to claim 2, wherein
in the socket of the light source unit, a portion on a semiconductor light-emitting element side is disposed inside the lamp chamber and a portion on a power supply member side is disposed outside the lamp chamber, or an entire portion is disposed inside the lamp chamber, and the control circuit is disposed inside or outside the lamp chamber, separately from the socket, and is electrically connected to a battery.

14. The light source unit for the vehicle lamp according to claim 1, wherein the semiconductor light-emitting element is mounted on the mounting member.

15. A vehicle lamp, comprising:

a lamp housing and a lamp lens that form a lamp chamber; and the light source unit according to claim 14, wherein in the socket of the light source unit, a portion on a semiconductor light-emitting element side is disposed inside the lamp chamber and a portion on a power supply member side is disposed outside the lamp chamber, or an entire portion is disposed inside the lamp chamber, and the control circuit is disposed inside or outside the lamp chamber, separately from the socket, and is electrically connected to a battery.

16. The light source unit for the vehicle lamp according to claim 1, wherein the substrate includes:

a first substrate mounted with the semiconductor light-emitting element; and a second substrate mounted with the power supply member, the first substrate and the second substrate are electrically connected to each other, and the semiconductor light-emitting element and the power supply member are electrically connected to each other via the first substrate and the second substrate.

17. A vehicle lamp, comprising:

a lamp housing and a lamp lens that form a lamp chamber; and the light source unit according to claim 16, wherein in the socket of the light source unit, a portion on a semiconductor light-emitting element side is disposed inside the lamp chamber and a portion on a power supply member side is disposed outside the lamp chamber, or an entire portion is disposed inside the lamp chamber, and the control circuit is disposed inside or outside the lamp chamber, separately from the socket, and is electrically connected to a battery.

18. A vehicle lamp, comprising:

a lamp housing and a lamp lens that form a lamp chamber; and the light source unit according to claim 1, wherein in the socket of the light source unit, a portion on a semiconductor light-emitting element side is disposed inside the lamp chamber and a portion on a power supply member side is disposed outside the lamp chamber, or an entire portion is disposed inside the lamp chamber, and the control circuit is disposed inside or outside the lamp chamber, separately from the socket, and is electrically connected to a battery.

\* \* \* \* \*